United States Patent
Evans et al.

(10) Patent No.: US 6,807,666 B1
(45) Date of Patent: Oct. 19, 2004

(54) METHODS AND ARRANGEMENTS FOR PROVIDING MULTIPLE CONCURRENT DESKTOPS AND WORKSPACES IN A SHARED COMPUTING ENVIRONMENT

(75) Inventors: Christopher A. Evans, Redmond, WA (US); Giampiero M. Sierra, Seattle, WA (US); Victor Tan, Kirkland, WA (US); Praerit Garg, Kirkland, WA (US); David Andrew Matthews, Sarnia (CA); Reiner Fink, Mercer Island, WA (US); Paul S. Hellyar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/573,628

(22) Filed: May 17, 2000

Related U.S. Application Data

(60) Provisional application No. 60/170,956, filed on Dec. 15, 1999.

(51) Int. Cl.$^7$ .............................................. G06F 9/00
(52) U.S. Cl. ...................................... 718/108; 345/778
(58) Field of Search ............................... 709/100, 203, 709/107, 108, 217, 219; 713/201; 345/473, 866, 778, 779; 712/9; 711/168

(56) References Cited

U.S. PATENT DOCUMENTS

| | | | | |
|---|---|---|---|---|
| 6,061,795 A | * | 5/2000 | Dircks et al. ................ | 713/201 |
| 6,278,448 B1 | * | 8/2001 | Brown et al. ................ | 345/866 |
| 6,327,623 B2 | * | 12/2001 | Watts ......................... | 709/229 |
| 6,369,821 B2 | * | 4/2002 | Merrill et al. ............... | 345/473 |
| 6,578,065 B1 | * | 6/2003 | Aglietti et al. .............. | 709/104 |

FOREIGN PATENT DOCUMENTS

| | | |
|---|---|---|
| EP | 0 747 810 A2 | 12/1996 |
| WO | WO 99/57863 | 11/1999 |
| WO | WO 99/63430 | 12/1999 |

OTHER PUBLICATIONS

Common Desktop Environment: Advanced User's and System Administrator's Guide, Digital UNIX version 4.0, Mar. 1996.*

Novell's Guide to Client Server Applications and Architecture, Schank, 1994.*

Schroeter et al., "An Application Interface With Multiple Workspaces: The Context Switcher", 1996 IEEE, pp. 318–319.

* cited by examiner

*Primary Examiner*—John Follansbee
*Assistant Examiner*—Haresh Patel
(74) *Attorney, Agent, or Firm*—Lee & Hayes, PLLC

(57) ABSTRACT

Methods and arrangements are provided for use in multiple user computing environments. These methods and arrangements can be configured to allow for a plurality of separate and concurrent desktops and workspaces within the shared computing environment. One method includes creating a separate desktop thread for each user that is authenticated during a logon process, creating a separate desktop associated with each desktop thread, and maintaining a list of desktop threads that are created. In this manner, several users can be logged on simultaneously. In certain implementations, the method further includes establishing a separate user environment associated with each desktop and launching a separate user shell associated with each desktop. The list of desktop threads allows for selective and/or automatic switching from a first desktop to a second desktop without terminating a desktop thread associated with the first desktop. The methods and arrangements are also applicable to remote process logon and switching.

21 Claims, 4 Drawing Sheets

METHODS AND ARRANGEMENTS FOR PROVIDING MULTIPLE CONCURRENT DESKTOPS AND WORKSPACES IN A SHARED COMPUTING ENVIRONMENT

RELATED APPLICATION

This application claims priority from U.S. Provisional Application Ser. No. 60/170,956, filed Dec. 15, 1999, and titled "Multiple Desktops To Provide Separate Concurrent Work Spaces For Multiple Users Using The Same Computer", the disclosure of which is incorporated by reference herein.

TECHNICAL FIELD

This invention relates to computers and software, and more particularly to methods and arrangements that provide a plurality of separate and concurrent desktops and workspaces within a shared computing environment.

BACKGROUND OF THE INVENTION

There are many situations where several people would like to share a single computer. For example, a home may have a single personal computer (PC) that is shared by the family members. If these users desire a unique configuration, privacy, and/or security for their applications and data files, such a shared computing environment may not adequately accommodate them.

For example, with most operating systems, the users share a single workspace. Unfortunately, doing so does not allow personalization of their workspace or security of data between users. In certain operating systems, users may separate their data into multiple "profiles" or "accounts". One of the drawbacks to this scheme is that if one user is using the computer and a another user would like to access their own files, the first user would have to close all open applications in order for the other user to log on to the system and access their data. Thus, the first user's application state is lost. In addition to losing the application state, the user is inconvenienced because of the time involved with closing down the prior user's state and re-establishing the new user's state.

Certain solutions, such as, for example, the "Identity Manager" available in Microsoft Outlook Express version 5.0, allow certain user data to be shared among separate users without losing all of the application's states during a user switch. However, the Identity Manager manages only a small subset of the user's data. Text documents, for example, are not stored separately for each user. Furthermore, there is little workspace personalization available and the user data is not secured for other user access.

Consequently, there is a need for an improved methods and arrangements for use in multiple user computing environments. Preferably, the methods and arrangements will allow for a plurality of separate and concurrent desktops and workspaces within the shared computing environment

SUMMARY OF THE INVENTION

The present invention provides improved methods and arrangements for use in multiple user computing environments. These methods and arrangements can be configured to allow for a plurality of separate and concurrent desktops and workspaces within the shared computing environment The above stated needs and other are met, for example, by a method for use in a multiple user computing environment logon user interface. The method includes creating a separate desktop thread for each user that is authenticated during a logon process, creating a separate desktop associated with each desktop thread, and maintaining a list of desktop threads that are created. In this manner, several users can be logged on simultaneously. In certain implementations, the method further includes establishing a separate user environment associated with each desktop and launching a separate user shell associated with each desktop. The list of desktop threads allows for the selective switching from a first desktop to a second desktop without terminating a desktop thread associated with the first desktop. Indeed, in certain implementations the method includes automatically switching from one desktop to another desktop without terminating the associated desktop threads. For example, this can occur following a configurably defined period of user inactivity. When a user logs off, then the method further includes selectively removing the applicable desktop thread from the list of desktop threads.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
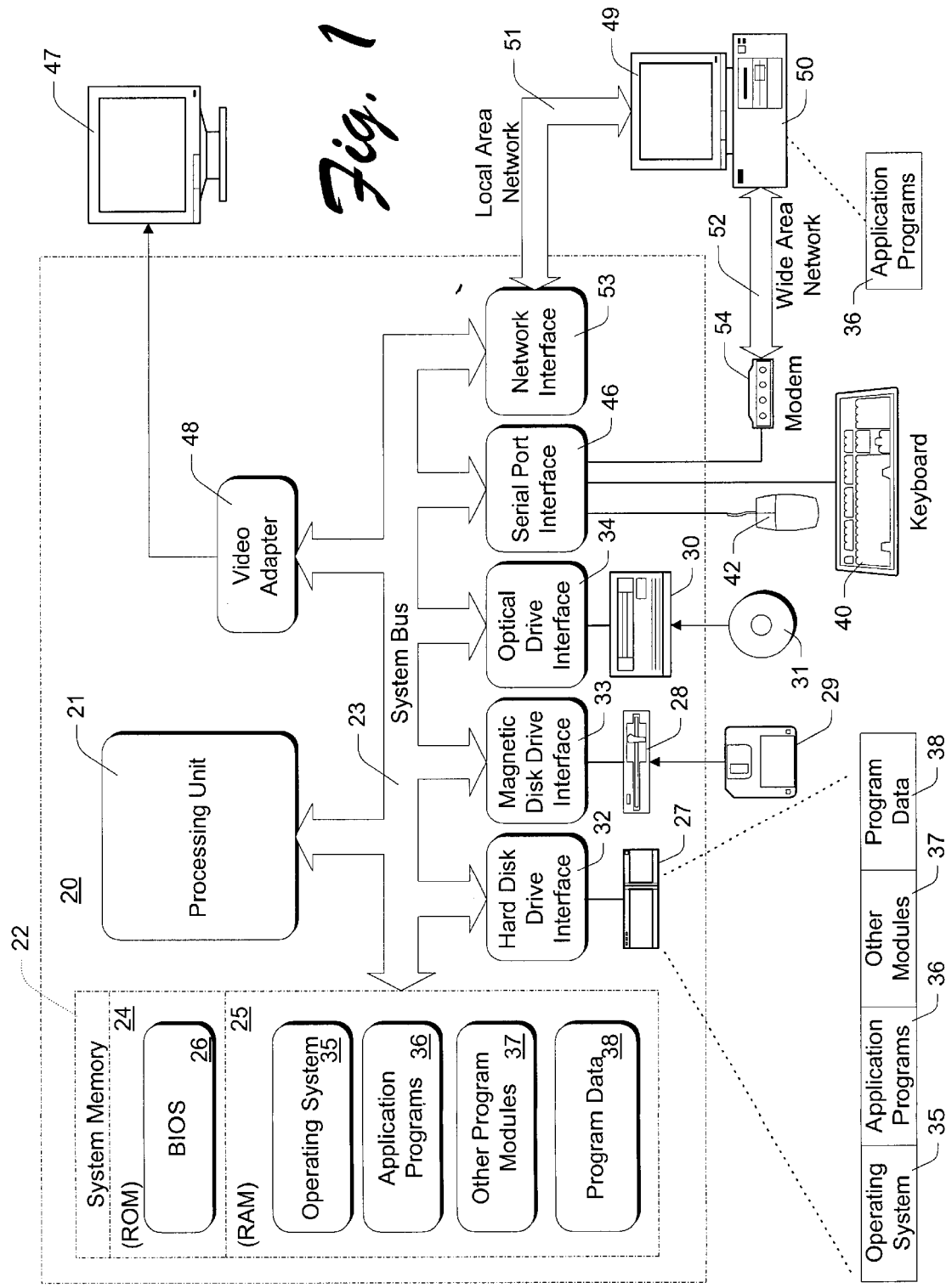
FIG. 1 is a block diagram depicting an exemplary computer system.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
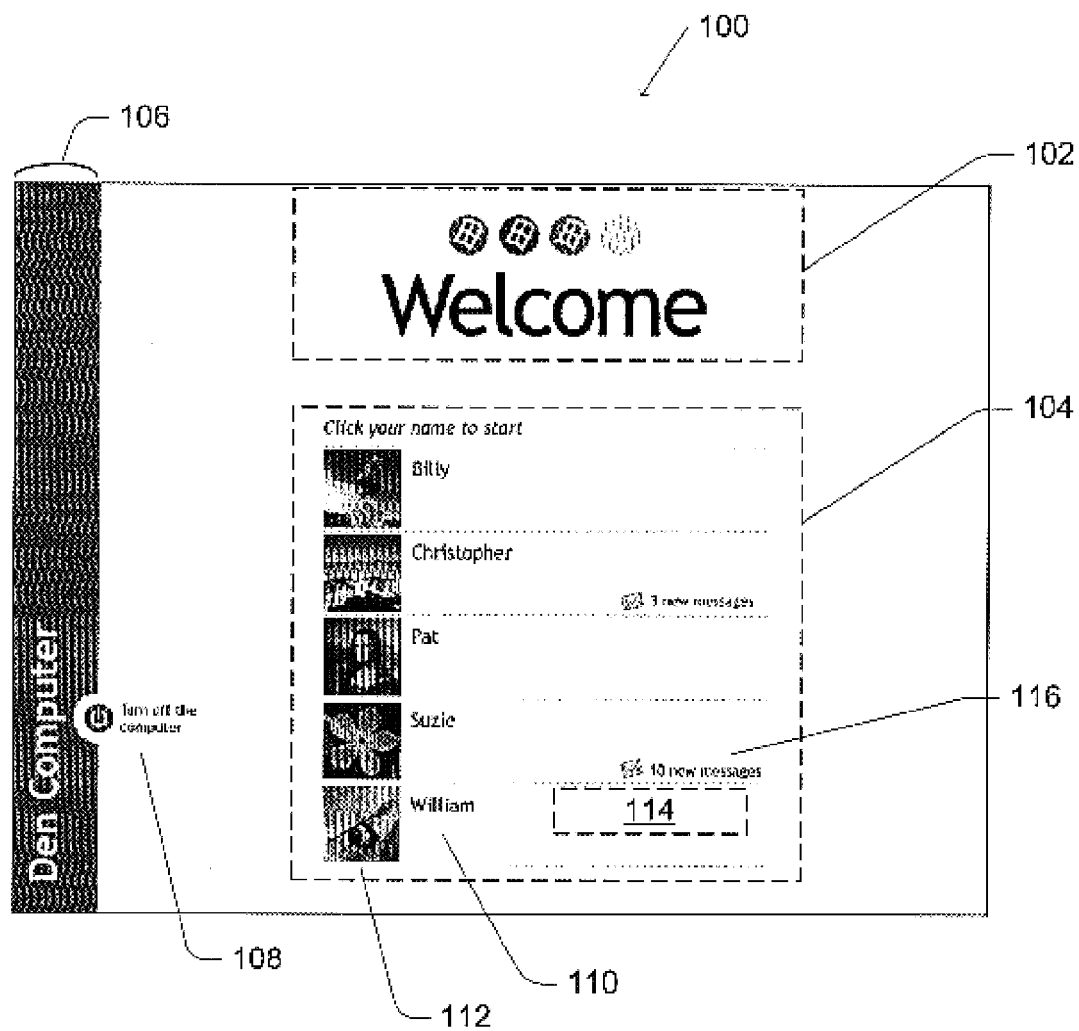
FIG. 2 depicts an exemplary logon screen display suitable for use in the computer system of FIG. 1.

Reference is now made to FIG. 2, which depicts an exemplary graphical user interface (GUI) display suitable for use in identifying users to the operating system of computer 20. Here, a logon screen 100 is shown as having a first title area 102 that identifies logon screen 100. Logon screen 100 may take up be a full screen of display 47 or a portion thereof. As shown, first title area 102 can include any graphical feature (e.g., bitmap, photo, video, text, etc).

Logon screen 100 also includes a multiple user logon area 104 wherein the user is presented with selectable user identifiers and related information and permitted to input certain data. In this example, logon area 104 is configured for five different users, namely, Billy, Christopher, Pat, Suzie, and William; each being identified by a text identifier 110 and/or graphical identifier 112. Thus, William may begin logging on to the operating system by selecting either text identifier 110 and/or graphical identifier 112. If William has an established password, then a password input field 114 is displayed and configured to receive his password. Once William's password has been authenticated then William is logged on. If William does not have an established password, then he would be logged on after selecting text identifier 110 or graphical identifier 112. Logon screen 100 can also be configured to display other user related information 116 to a user. In this example, user related information 116 identifies that Suzie has ten (10) new messages.

A second title area 106 is shown in this example along the left hand border of logon screen 100. Here, second title area 106 identifies the computer as the "Den Computer". A selectable shut down mechanism 108 is also provided to allow a user to shut down the computer.

Logon screen 100 is, by way of example, the starting point for this description of the various methods and arrangements that allow for a plurality of separate and concurrent desktops and workspaces within the shared computing environment of computer 20. As described in more detail below and depicted in the flowcharts of FIGS. 3–4, a desktop switching scheme is implemented for use with Microsoft Windows™ NT or Windows™ 2000. Those skilled in the art, however, will recognize that the desktop switching scheme is applicable to other operating systems, computers, etc. For example, the scheme is extended herein to further include WinStation switching, each of which may include desktop switching as well.

The exemplary implementations presented herein utilize the Desktop application programming interfaces (APIs) available in Windows NT to create separate workspaces for each user who interactively logs on through logon screen 100. Using Windows NT profiles, the user's data is separated from other user's data and depending on the user's or the computer manager's preferences, access to other user's data can be secured. By using a separate desktop for each user, multiple users can be logged on to the computer simultaneously. Switching users is very fast, since it is just a desktop switch. No application state is lost during the switch because the applications run within the context of a desktop and are completely separated from one another.

To protect the user's logon session from other users if the users should happen to walk away form the computer without securing their workstation, the operating system will automatically switch back to the logon desktop after a user configurable timeout period. The logon desktop is secured from the user desktops and can only switch back to a user desktop if the user is identified by an authentication entity within the operating system.

Figure 3:
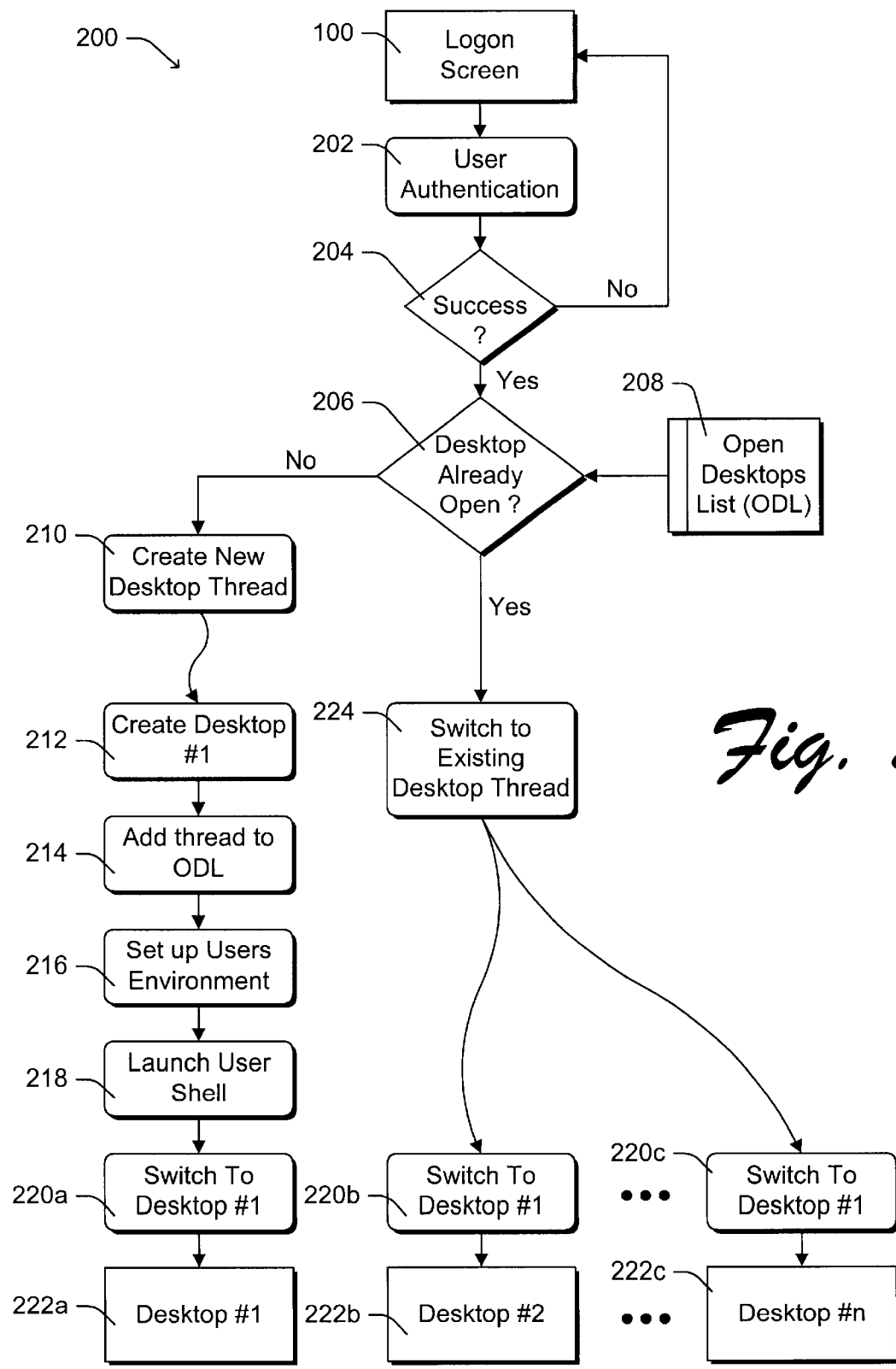
FIG. 3 is a flowchart depicting an exemplary process for identifying users, and creating and maintaining a plurality of separate and concurrent desktops or remote processes.

With this in mind, attention is drawn to the flowchart in FIG. 3. Here, process 200 begins with the computer displaying logon screen 100. In step 202, the user provides the necessary inputs to logon as part of the user authentication scheme. For example, the user selects text identifier 110 or graphical identifier 112 and subsequently enters a password in password input field 114. The authentication process occurs in the operating system, as depicted by decision step 204. If the authentication was not a success, then in accord with step 204 (NO), process 200 returns to logon screen 100. If the authentication was a success, then in accord with step 204 (YES), process 200 continues to decision step 206.

In decision step 206, it is determined if the authenticated user from step 204 is already logged in. This is accomplished by checking open desktops list (ODL) 208. If the authenticated user has not already logged in per step 206 (NO), then in accordance with step 210 a new desktop thread is created for this user. In step 214, the thread and desktop information are then added to the list of users currently logged on within ODL 208. The user's thread also sets up the user environment in step 216, and starts the user shell on their newly created desktop in step 218. In step 220 the logon program switches to the user's new desktop 222. At this point, the logon process is complete.

Returning to decision step 206, if a desktop is already open for the user as demonstrated by an associated entry in ODL 208, then step 206 (YES) advances process 200 to step 224. In step 224, a switch is made to the existing desktop thread, followed by a switch to the applicable desktop 222, in step 220. In FIG. 3 there are N>1 desktops as represented by desktops 222a–c.

Figure 4:
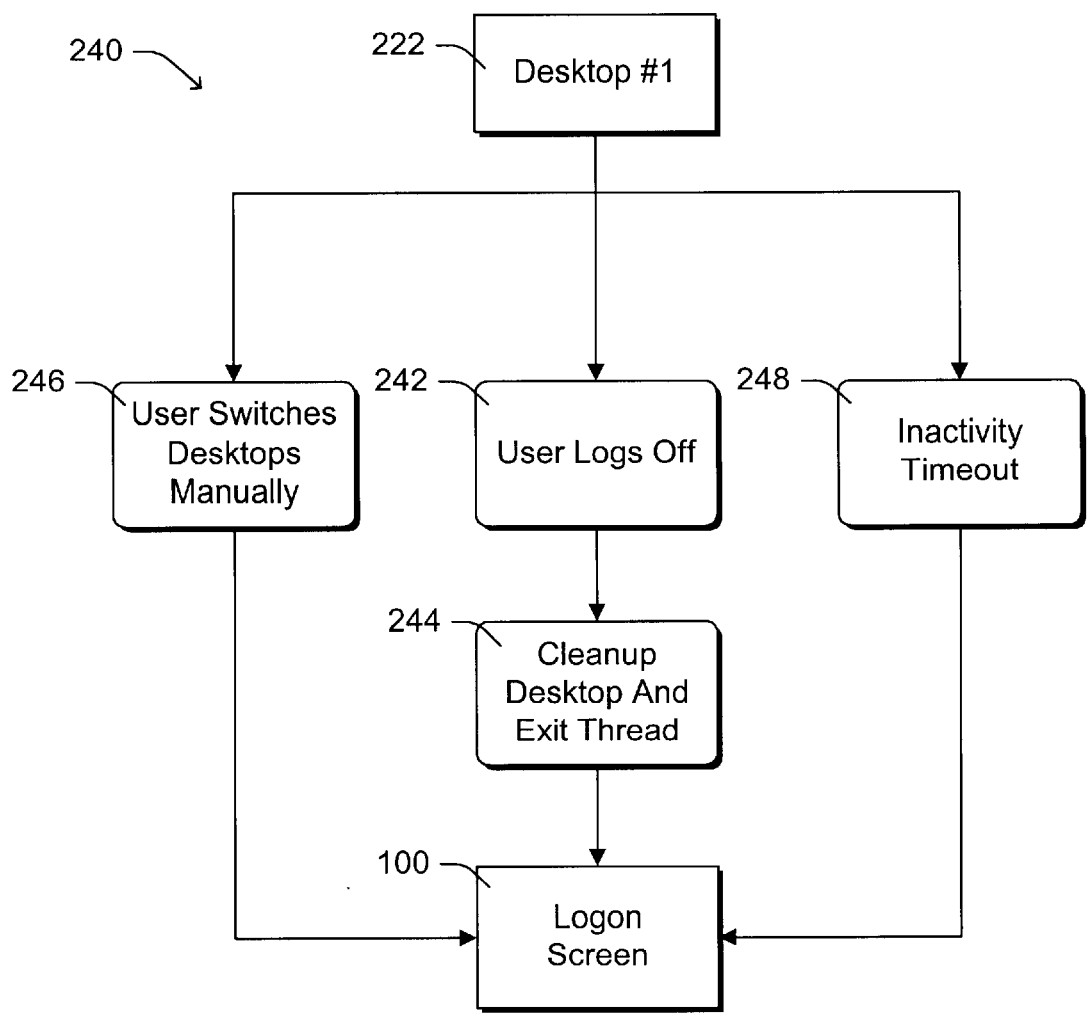
FIG. 4 is a flowchart depicting an exemplary process for switching between desktops or remote processes.

Reference is now made to FIG. 4, wherein a flowchart depicts a process 240 for logging off of a desktop 222. In this example, there are three ways for the user to become "logged off". The first takes place in step 242, wherein the user intentionally and fully logs off. When such a logoff event is generated in step 242, then in step 244 the desktop is cleaned up, ODL 208 is updated and the thread is terminated. After step 244, process 240 returns to logon screen 100.

The second way for a user to become "logged off" is provided in step 246, wherein the user switches desktops manually. At any point prior to logging off, the user can initiate an action (e.g., by user input), which will return them to logon screen 100 without signaling the user's thread that a logoff has occurred. When this happens, the users desktop remains running and all applications that have been started on that desktop continue to run. However, the user is unable to see any of these applications because their desktop is essentially hidden. At this point, the desktop is said to be "switched out", but it is still active. The user will need to log on again in accord with process 200 to have the active desktop "switched in".

The third way that a user can become "logged off" is shown in step 248, wherein after a user configurable period of inactivity (e.g., no mouse activity or keyboard input) the operating system will assume that the user has stopped working on the computer for the time being and it will automatically switch back to logon screen 100. This helps to improve security by securing the user's desktop when they no longer appear to be using the computer. It also makes it easier for other users to utilize the computer and not worry about ending another user's session.

It is also possible to provide a plurality of separate and concurrent environments within the shared computing environment by switching remote processes, such as, for example, WinStations, instead of desktops. Logically, WinStations contain multiple desktops. Creating a WinStation for each user and switching the active WinStation when a user logs on or switches back to logon screen 100 could implement the same mechanism as described above.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
    configuring a single computer to be concurrently and physically shared by multiple users by executing a plurality of concurrent switchable desktop environments within the single computer by:
    presenting a logon user interface to each said user physically seeking to use said computer; and
    within the computer:
        creating a separate desktop thread for each said user that is authenticated by the logon user interface;
        creating a separate desktop associated with each said desktop thread for said concurrent switchable desktop environments;
        displaying only one said desktop as active at a time; and
        maintaining a list of said desktop threads to support switching from a first said desktop to a second said desktop.

2. The method as recited in claim 1, further comprising:
    establishing a separate user environment associated with each said desktop.

3. The method as recited in claim 1, further comprising:
    launching a separate user shell associated with each said desktop.

4. The method as recited in claim 1, further comprising:
    selectively switching from the first said desktop to the second said desktop without terminating the desktop thread associated with the first said desktop.

5. The method as recited in claim 1, further comprising:
    automatically switching from a first said desktop to a second said desktop without terminating the desktop thread associated with the first said desktop; and
    launching a separate user shell associated with each said desktop.

6. The method as recited in claim 5, wherein the automatically switching from the first said desktop to the second said desktop occurs following a defined period of said user inactivity.

7. The method as recited in claim 1, further comprising:
    selectively removing at least one said desktop thread from the list of said desktop threads when said user logs off.

8. A computer-readable medium having computer executable instructions for causing at: least one processor to perform steps comprising:
    configuring a single computer to be concurrently and physically shared by multiple users by executing a plurality of concurrent switchable desktop environments within the single computer by:
    presenting a logon user interface to each said user physically seeking to use said computer; and
    within the computer:
        creating a separate desktop thread for each said user that is authenticated by the logon user interface;
        creating a separate desktop associated with each said desktop thread for said concurrent switchable desktop environments;
        displaying only one said desktop as active at a time; and
        maintaining a list of said desktop threads to support switching from a first said desktop to a second said desktop.

9. The computer-readable medium as recited in claim 8, having further computer-executable instructions for performing the step of:
    establishing a separate user environment associated with each said desktop.

10. The computer-readable medium as recited in claim 8, having further computer-executable instructions for performing the step of:
    launching a separate user shell associated with each said desktop.

11. The computer-readable medium as recited in claim 8, having further computer-executable instructions for performing the step of:
    selectively switching from the first said desktop to the second said desktop without terminating the desktop thread associated with the first said desktop.

12. The computer-readable medium as recited in claim 8, having further computer-executable instructions for performing the step of:

automatically switching from a first said desktop to a second said desktop without terminating the desktop thread associated with the first said desktop; and launching a separate user shell associated with each said desktop.

13. The computer-readable medium as recited in claim 12, wherein the automatically switching from the first said desktop to the second said desktop occurs following a defined period of said user inactivity.

14. The computer-readable medium as recited in claim 8, having further computer-executable instructions for performing the step of:

selectively removing at least one said desktop thread from the list of said desktop threads when said user logs off.

15. An arrangement comprising:

a single computer capable of being concurrently and physically shared by multiple users by executing a plurality of concurrent switchable desktop environments within the single computer, the computer having:

memory having at least a portion of an operating system stored therein; and at least one processor operatively coupled to the memory and responsive to the operating system to present a logon user interface to each said user physically seeking to use the computer, create a separate desktop thread within the computer for each said user that is authenticated through the logon user interface, create a separate desktop associated with each said desktop thread, display only one said desktop as active at a time; and maintain a list of said desktop threads to support switching from a first said desktop to a second said desktop.

16. The arrangement as recited in claim 15, wherein the processor is further responsive to the operating system by establishing a separate user environment associated with each said desktop.

17. The arrangement as recited in claim 15, wherein the processor is further responsive to the operating system by launching a separate user shell associated with each said desktop.

18. The arrangement as recited in claim 15, wherein the processor is further responsive to the operating system by selectively switching from the first said desktop to the second said desktop without terminating the desktop thread associated with the first said desktop.

19. The arrangement as recited in claim 15, wherein the processor is further responsive to the operating system by:

automatically switching from a first said desktop to a second said desktop without terminating the desktop thread associated with the first said desktop; and launching a separate user shell associated with each said desktop.

20. The arrangement as recited in claim 19, wherein the automatically switching from the first said desktop to the second said desktop occurs following a defined period of said user inactivity.

21. The arrangement as recited in claim 15, wherein the processor is further responsive to the operating system by selectively removing at least one said desktop thread from the list of said desktop threads when said user logs off.

* * * * *